United States Patent
Kwon et al.

(10) Patent No.: US 7,869,460 B2
(45) Date of Patent: Jan. 11, 2011

(54) METHOD OF ALLOCATING UPSTREAM BANDWIDTH

(75) Inventors: Eun Jung Kwon, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 74 days.

(21) Appl. No.: 12/249,380

(22) Filed: Oct. 10, 2008

(65) Prior Publication Data

US 2009/0154538 A1    Jun. 18, 2009

(30) Foreign Application Priority Data

Dec. 14, 2007  (KR) .................. 10-2007-0131360

(51) Int. Cl.
*H04J 3/16* (2006.01)

(52) U.S. Cl. ............... 370/468; 375/222; 455/452.1; 709/226

(58) Field of Classification Search .............. None
See application file for complete search history.

(56) References Cited

U.S. PATENT DOCUMENTS

2007/0195817 A1* 8/2007 Denney et al. ............. 370/468
2008/0101399 A1* 5/2008 Sexton et al. ............. 370/461

FOREIGN PATENT DOCUMENTS

KR    1019990066567 A    8/1999

* cited by examiner

*Primary Examiner*—Seema S Rao
*Assistant Examiner*—Khoa Huynh
(74) *Attorney, Agent, or Firm*—Ladas & Parry LLP

(57) ABSTRACT

A cable modem termination system receives a bandwidth request message, and collects information on the basis of the bandwidth request message. Then, time bandwidth size information is generated on the basis of the bandwidth request message and the collected information, and a bandwidth allocation message is generated on the basis of the collected information and the time bandwidth size information. Accordingly, a cable modem termination system can effectively receive data transmitted from a cable modem.

8 Claims, 7 Drawing Sheets

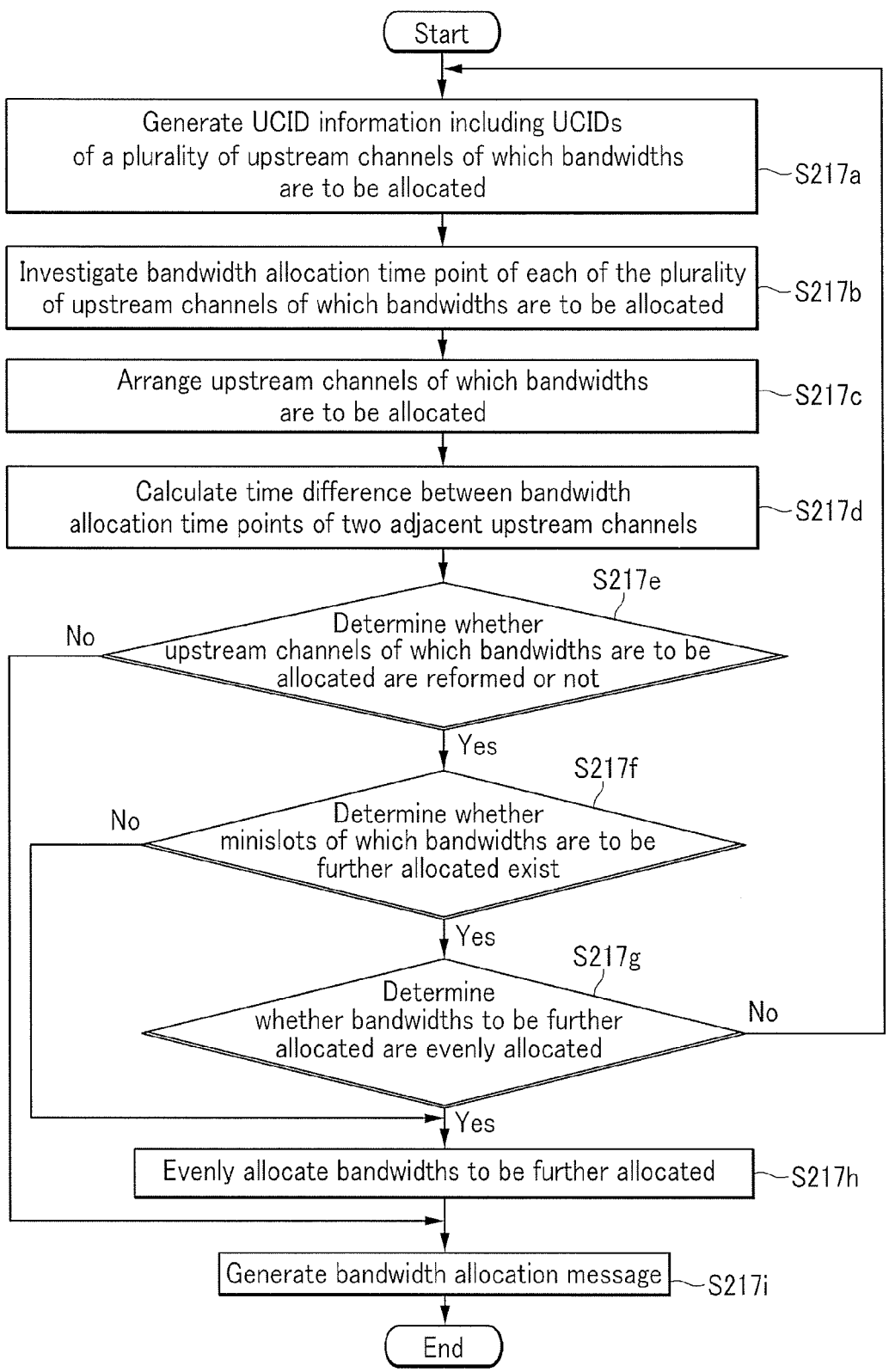

METHOD OF ALLOCATING UPSTREAM BANDWIDTH

CROSS-REFERENCE TO RELATED APPLICATION

This application claims priority to and the benefit of Korean Patent Application No. 10-2007-0131360 filed in the Korean Intellectual Property Office on Dec. 14, 2007, the entire contents of which are incorporated herein by reference.

BACKGROUND OF THE INVENTION (a) Field of the Invention

The present invention relates to a method of allocating an upstream bandwidth. More particularly, the present invention relates to a method of allocating an upstream bandwidth that effectively receives segment data in a cable modem termination system.

The present invention is supported by the IT R&D program of MIC/IITA [2006-S-019-02, The Development of Digital Cable Transmission and Receive System for 1 Gbps Downstream].

(b) Description of the Related Art

As digital convergence is rapidly progressing, cable networks are being widely used in fields of video-on-demand service, high-speed Internet service, and voice over internet protocol (VoIP) service as well as using the existing broadcasting signal. Accordingly, the cable network is used to provide a communication-broadcasting convergence service.

The data over cable service interface specification (DOCSIS) 3.0 defines a data transmission technique, which uses a cable network, as one of cable techniques that are used to provide the above-mentioned communication broadcasting convergence service. In this case, upstream/downstream channel combination defined in the DOCSIS 3.0 is a technique that provides two or more downstream channel receiving devices and two or more upstream channel transmitting devices to a cable modem (CM) in order to increase data transmission speed between a cable modem termination system (CMTS) and the cable modem.

However, time required for receiving data from the cable modem may depend on how the cable modem termination system allocates an upstream bandwidth.

SUMMARY OF THE INVENTION

The present invention has been made in an effort to provide a method of allocating an upstream bandwidth that has advantages of effectively receiving data in a cable modem termination system.

An exemplary embodiment of the present invention provides a method of allocating an upstream bandwidth that allocates an upstream bandwidth to a modem of which channel combination is supported by a system. The method includes receiving a bandwidth request message that includes bandwidth demand information and service identifier information corresponding to the modem, collecting channel identifier information and channel number information of a plurality of channels for the modem on the basis of the service identifier information, generating time bandwidth size information that represents the size of the time bandwidth to be allocated to each of the plurality of channels on the basis of the bandwidth demand information and the channel number information, and generating a bandwidth allocation message that allocates a part of the plurality of channels to the modem on the basis of the channel identifier information and the time bandwidth size information.

In this case, the bandwidth allocation message may include channel identifier information that includes identifiers of a plurality of channels to be allocated to the modem, bandwidth allocation time point information that includes bandwidth allocation time points of the plurality of channels to be allocated to the modem, and bandwidth size information that includes sizes of time bandwidths to be allocated to the plurality of channels to be allocated to the modem.

Further, the generating of the bandwidth allocation message may include arranging a plurality of channels in an order of bandwidth allocation time points of the plurality of channels, calculating time difference between the bandwidth allocation time points of the plurality of channels arranged according to the bandwidth allocation time points, allocating a part of the plurality of channels to the modem according to a time difference between the bandwidth allocation time points and bandwidth division information, and further allocating time bandwidths, which are allocated to other channels not allocated to the modem among the plurality of channels, to the modem.

Furthermore, the calculating of the time difference may calculate a time difference between the bandwidth allocation time points of two adjacent channels of the plurality of arranged channels.

In addition, if the time difference between the bandwidth allocation time points of the two adjacent channels is larger than the size of the time bandwidth allocated to a channel that has a later bandwidth allocation time point of the two adjacent channels, the allocating of a part of the plurality of channels to the modem may allocate a part of the channels except for the channel that has the later bandwidth allocation time point of the plurality of channels to the modem.

Additionally, the further allocating of the time bandwidths may evenly allocate time bandwidths, which are allocated to a part of channels not allocated to the modem, to the modem.

Furthermore, the generating of the time bandwidth size information may include generating bandwidth division information that includes the size of a bandwidth to be allocated to each of the plurality of channels according to the bandwidth demand information and the channel number information, and calculating the number of minislots that corresponds to the size of a bandwidth to be allocated to each of the plurality of channels on the basis of the bandwidth division information in order to generate minislot number information that includes the number of minislots to be allocated to each of the plurality of channels.

In addition, the size of the bandwidth to be allocated to each of the plurality of channels may be proportional to the bandwidth demand information, and inversely proportional to the channel number information.

Further, the time bandwidth of each of the plurality of channels may be composed of minislots that have different time intervals, and the numbers of minislots to be allocated to the plurality of channels may be different from each other.

Furthermore, the method of allocating an upstream bandwidth may further include transmitting the bandwidth allocation message to the modem.

Another embodiment of the present invention provides a method of allocating an upstream bandwidth that allocates an upstream bandwidth to a modem of which channel combination is supported by a system. The method includes investigating a bandwidth allocation time point of each of a plurality of upstream channels allocated to the modem, arranging the plurality of upstream channels in an order of bandwidth allocation time points of the plurality of upstream channels, calculating a time difference between bandwidth allocation time points of first and second upstream channels of the plurality of upstream channels arranged in the order of the bandwidth allocation time points of the plurality of upstream channels, and allocating upstream channels except for the second upstream channel among the plurality of upstream channels to the modem if the time difference is larger than a threshold value.

In this case, the first and second upstream channels may be adjacent to each other, and the bandwidth allocation time point of the second upstream channel may be later than the bandwidth allocation time point of the first upstream channel.

BRIEF DESCRIPTION OF THE DRAWINGS

FIG. 7 is a view illustrating a method of generating a bandwidth allocation message according to an exemplary embodiment of the present invention.

DETAILED DESCRIPTION OF THE EMBODIMENTS

Figure 1:
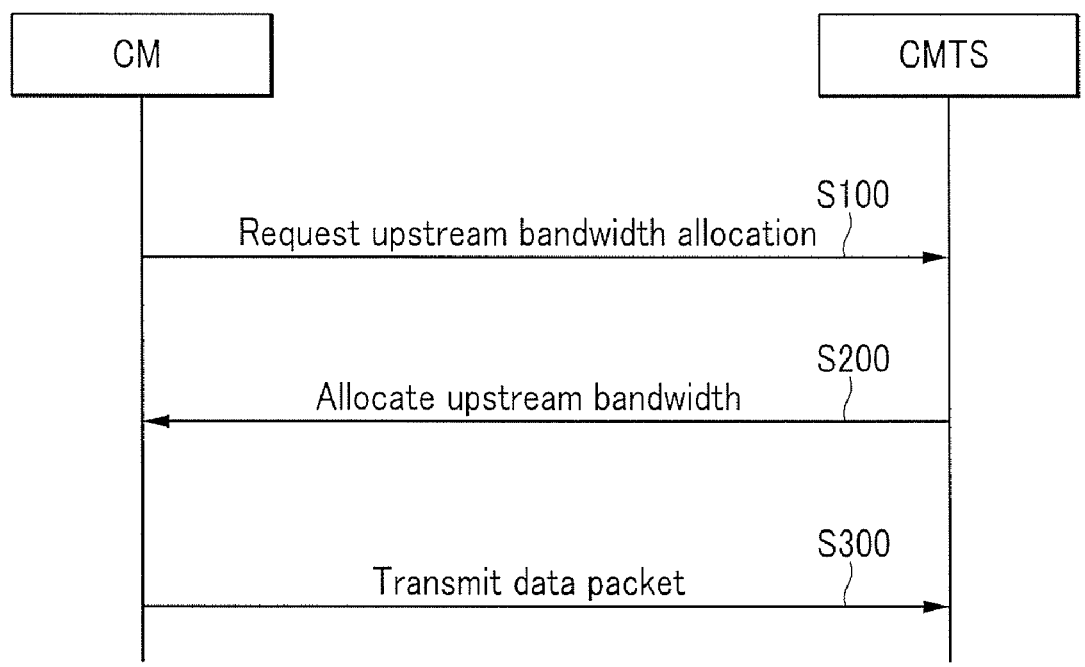
FIG. 1 is a view illustrating a method of transmitting a packet to a cable modem termination system by a cable modem according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms "-er", "-or", and "module" described in the specification mean units for processing at least one function and operation and can be implemented by hardware components or software components and combinations thereof.

Hereinafter, a method of allocating an upstream bandwidth according to an exemplary embodiment of the present invention will be described with reference to accompanying drawings.

A method of transmitting a data packet to a cable modem termination system (hereinafter, referred to as a "CMTS") through an upstream bandwidth by a cable modem (hereinafter, referred to as a "CM") according to an exemplary embodiment of the present invention will now be described with reference to FIGS. 1 to 5.

FIG. 1 is a view illustrating a method of transmitting a packet to a cable modem termination system by a cable modem according to an exemplary embodiment of the present invention.

As shown in FIG. 1, when there is a data packet that is to be transmitted to a CMTS by a CM, first, the CM transmits a bandwidth request message to the CMTS in order to request upstream bandwidth allocation required for transmitting a data packet (S100).

In this case, the bandwidth request message may include a service identifier (hereinafter referred to as a "SID") corresponding to the CM and the size of the data packet to be transmitted.

Further, if the CM and the CMTS conform to a data over cable service interface specification (hereinafter referred to as a "DOCSIS") 3.0 in this case, the CM may communicate with the CMTS through two or more upstream channels or downstream channels.

The data packet that is to be transmitted to the cable modem termination system by the cable modem according to the exemplary embodiment of the present invention will be described below with reference to FIG. 2.

Figure 2:
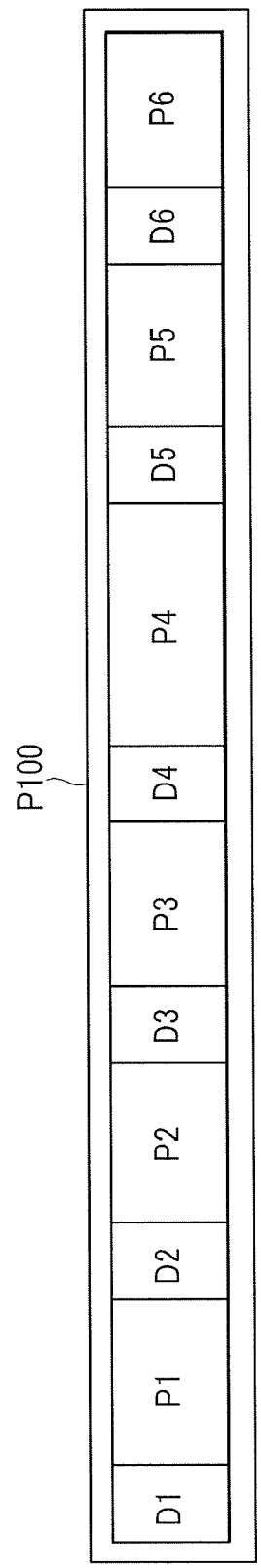
FIG. 2 is a view showing the configuration of a data packet according to an exemplary embodiment of the present invention.

FIG. 2 is a view showing the configuration of a data packet according to an exemplary embodiment of the present invention.

As shown in FIG. 2, a data packet P100 according to an exemplary embodiment of the present invention includes a plurality of information fields P1, P2, P3, P4, P5, and P6, and a plurality of headers D1, D2, D3, D4, D5, and D6 that correspond to the plurality of information fields, respectively.

In this case, the first header D1 corresponds to the first information field P1, the second header D2 corresponds to the second information field P2, and the third header D3 corresponds to the third information field P3.

Further, in this case, the fourth header D4 corresponds to the fourth information field P4, the fifth header D5 corresponds to the fifth information field P5, and the sixth header D6 corresponds to the sixth information field P6.

A method of transmitting a data packet to the CMTS through an upstream bandwidth by the CM according to the exemplary embodiment of the present invention will be described with reference to FIG. 1 again.

The CMTS transmits a bandwidth allocation message that corresponds to the bandwidth request message to the CM, and allocates an upstream bandwidth used for the data packet to the CM (S200).

In this case, the CMTS may generate a bandwidth allocation message. The bandwidth allocation message includes information about an upstream channel identifier (hereinafter referred to as a "UCID") of which a bandwidth is to be allocated, start time information informing of the start of the transmission, and end time information informing of the end of the transmission.

Further, if the CM and the CMTS conform to the DOCSIS 3.0 in this case, the CMTS may generate a bandwidth allocation message so that the CM transmits a data packet through two or more upstream channels.

The configuration of the upstream channel, which corresponds to the bandwidth allocation message generated by the CMTS according to the exemplary embodiment of the present invention, will be described below with reference to FIG. 3.

Figure 3:
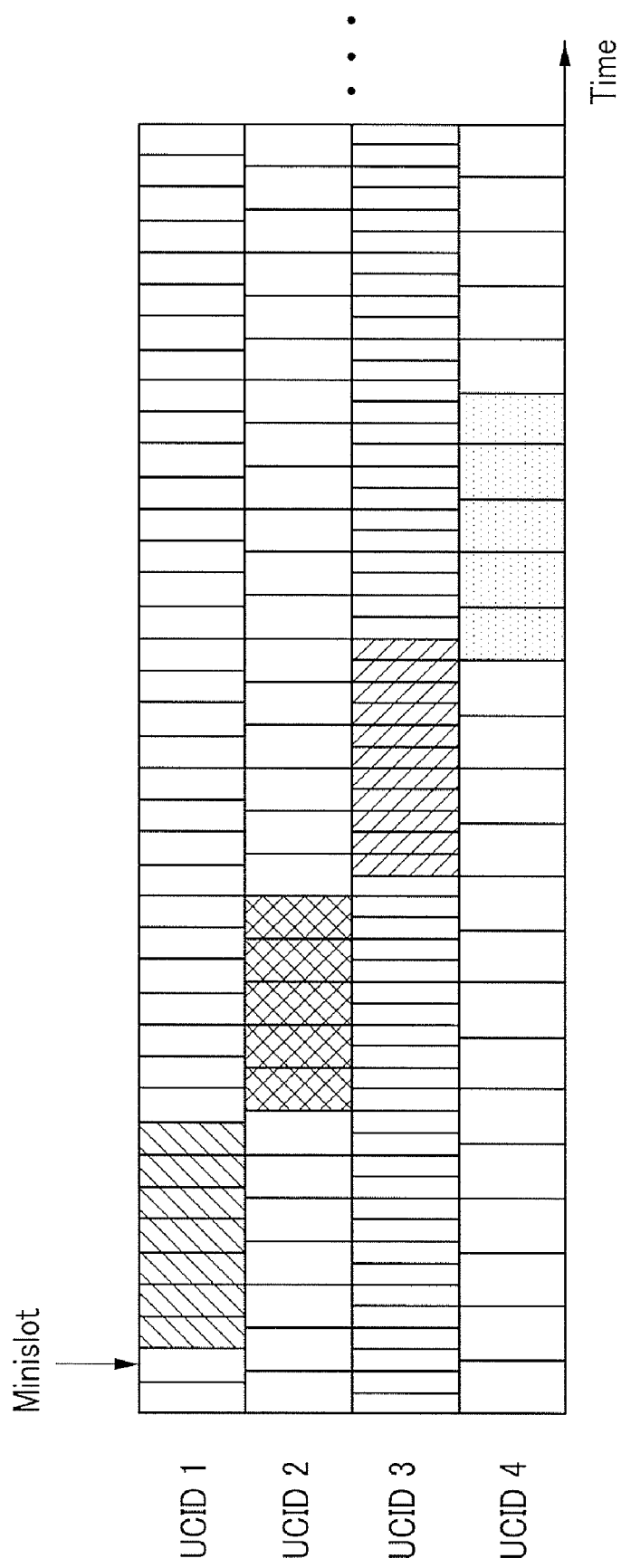
FIG. 3 is a view showing the configuration of an upstream channel that corresponds to a bandwidth allocation message according to an exemplary embodiment of the present invention.

FIG. 3 is a view showing the configuration of an upstream channel that corresponds to the bandwidth allocation message according to the exemplary embodiment of the present invention.

When the CMTS allocates four upstream channels to the CM as shown in FIG. 3, the bandwidth allocation message includes UCID information, start time information, and end time information of the four allocated upstream channels.

In this case, each of the upstream channels may be composed of minislots that have the same time interval, and each of the allocated four upstream channels may be composed of minislots that have different time intervals.

Further, in this case, the start time information included in the bandwidth allocation message may include start minislot information of each of the four upstream channels, and the end time information may include end minislot information of each of the four upstream channels.

The method of transmitting a data packet to the CMTS through an upstream bandwidth by the CM according to the exemplary embodiment of the present invention will be described with reference to FIG. 1 again.

The CM transmits a data packet to the CMTS according to the bandwidth allocation message (S300). If the CM and the CMTS conform to the DOCSIS 3.0 in this case, the CM may transmit a data packet to the CMTS through two or more upstream channels.

A method of transmitting a data packet to the CMTS through the four upstream channels by the CM according to the exemplary embodiment of the present invention will be described below with reference to FIGS. 4 and 5.

Figure 4:
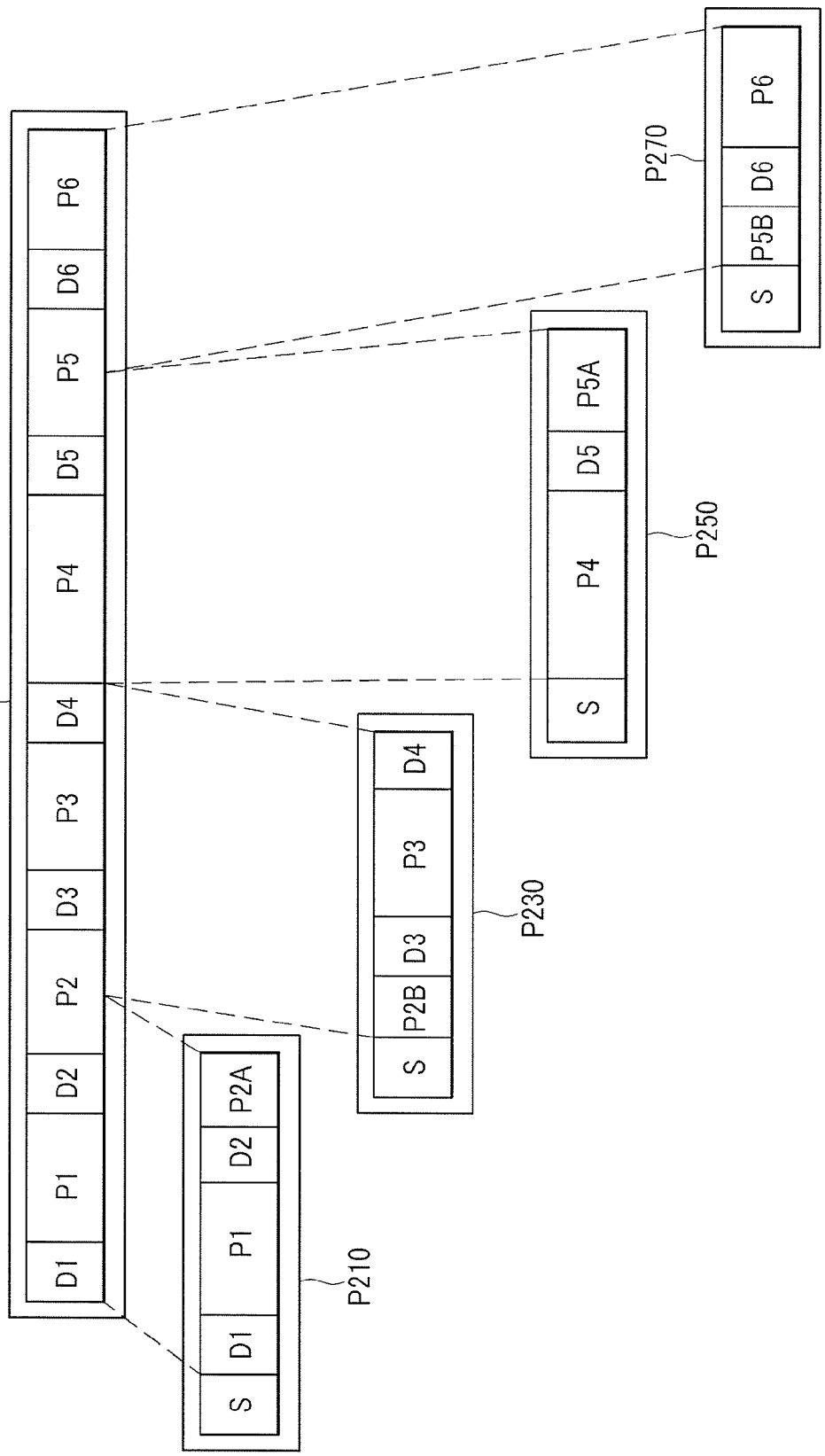
FIG. 4 is a view illustrating a method of generating a plurality of segment data by a cable modem according to an exemplary embodiment of the present invention.

FIG. 4 is a view illustrating a method of generating a plurality of segment data by a cable modem according to an exemplary embodiment of the present invention.

As shown in FIG. 4, the CM divides the data packet P100 according to the bandwidth allocation message, and generates four segment data P210, P230, P250, and P270.

The first segment data P210 includes a segment header S, a first header D1, a first information field P1, a second header D2, and a front portion P2A of a second information field.

The second segment data P230 includes a segment header S, a rear portion P2B of the second information field, a third header D3, a third information field P3, and a fourth header D4.

The third segment data P250 includes a segment header S, a fourth information field P4, a fifth header D5, and a front portion P5A of the fifth information field.

The fourth segment data P270 includes a segment header S, a rear portion P5B of a fifth information field, a sixth header D6, and a sixth information field P6.

Figure 5:
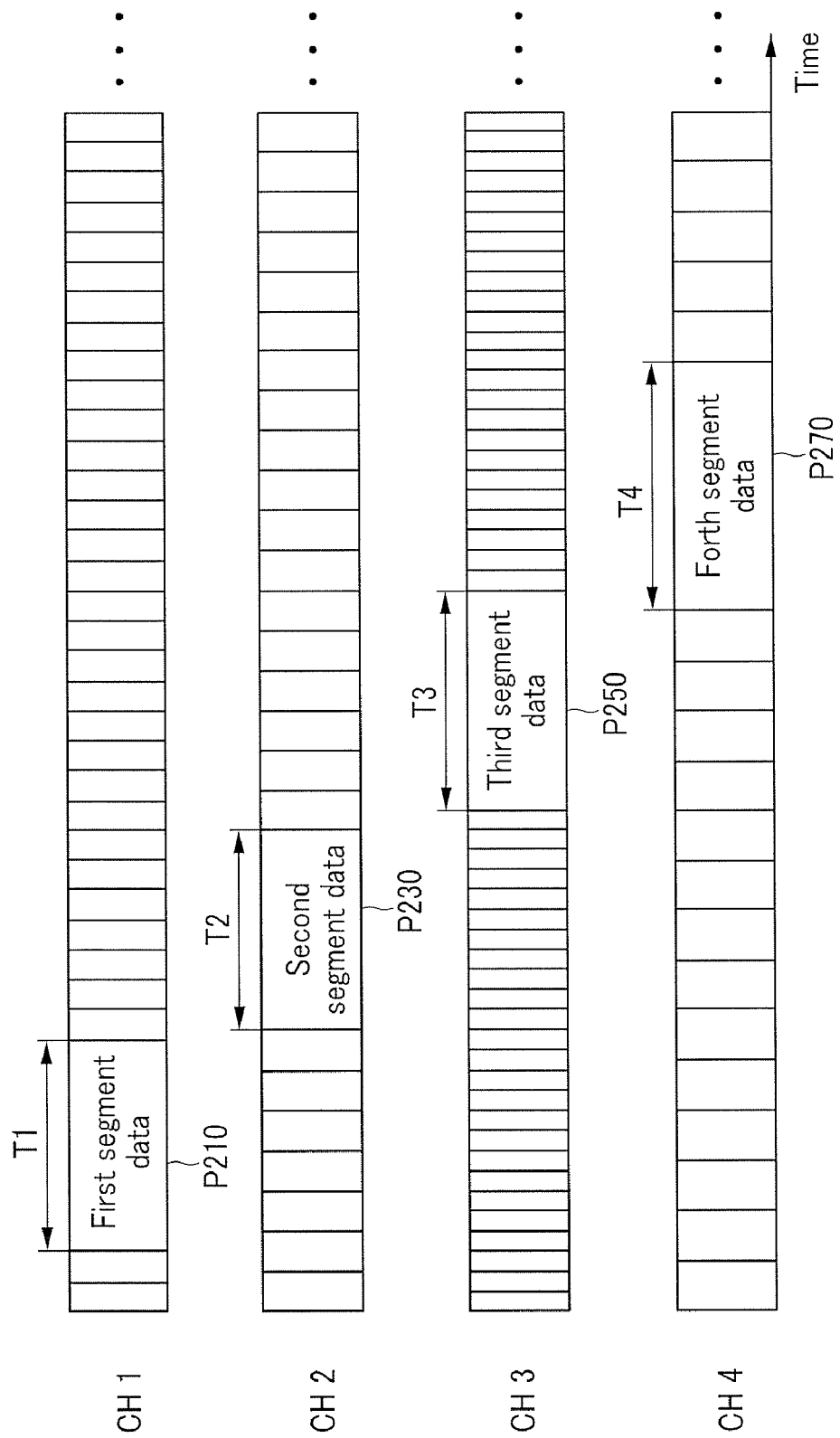
FIG. 5 is a view illustrating a method of transmitting a plurality of segment data through a plurality of upstream channels by the cable modem according to the exemplary embodiment of the present invention.

FIG. 5 is a view illustrating a method of transmitting a plurality of segment data through a plurality of upstream channels by the cable modem according to the exemplary embodiment of the present invention.

As shown in FIG. 5, the CM transmits four segment data P210, P230, P250, and P270 to the CMTS through the four upstream channels according to the bandwidth allocation message.

The CM transmits the first segment data P210 in a first upstream channel CH1 for a first transmission time T1 according to the bandwidth allocation message. In this case, the CM transmits the first segment data P210 through the first upstream channel CH1 according to the UCID information of the bandwidth allocation message, and the CM transmits the first segment data P210 for the first transmission time T1 according to the start time information and the end time information of the bandwidth allocation message.

The CM transmits the second segment data P230 in a second upstream channel CH2 for a second transmission time T2 according to the bandwidth allocation message. In this case, the CM transmits the second segment data P230 through the second upstream channel CH2 according to the UCID information of the bandwidth allocation message, and the CM transmits the second segment data P230 for the second transmission time T2 according to the start time information and the end time information of the bandwidth allocation message.

The CM transmits the third segment data P250 in a third upstream channel CH3 for a third transmission time T3 according to the bandwidth allocation message. In this case, the CM transmits the third segment data P250 through the third upstream channel CH3 according to the UCID information of the bandwidth allocation message, and the CM transmits the third segment data P250 for the third transmission time T3 according to the start time information and the end time information of the bandwidth allocation message.

The CM transmits the fourth segment data P270 in a fourth upstream channel CH4 for a fourth transmission time T4 according to the bandwidth allocation message. In this case, the CM transmits the fourth segment data P270 through the fourth upstream channel CH4 according to the UCID information of the bandwidth allocation message, and the CM transmits the fourth segment data P270 for the fourth transmission time T4 according to the start time information and the end time information of the bandwidth allocation message.

A method of allocating an upstream bandwidth to the CM by the CMTS according to the exemplary embodiment of the present invention will be described below with reference to FIGS. 6 and 7.

Figure 6:
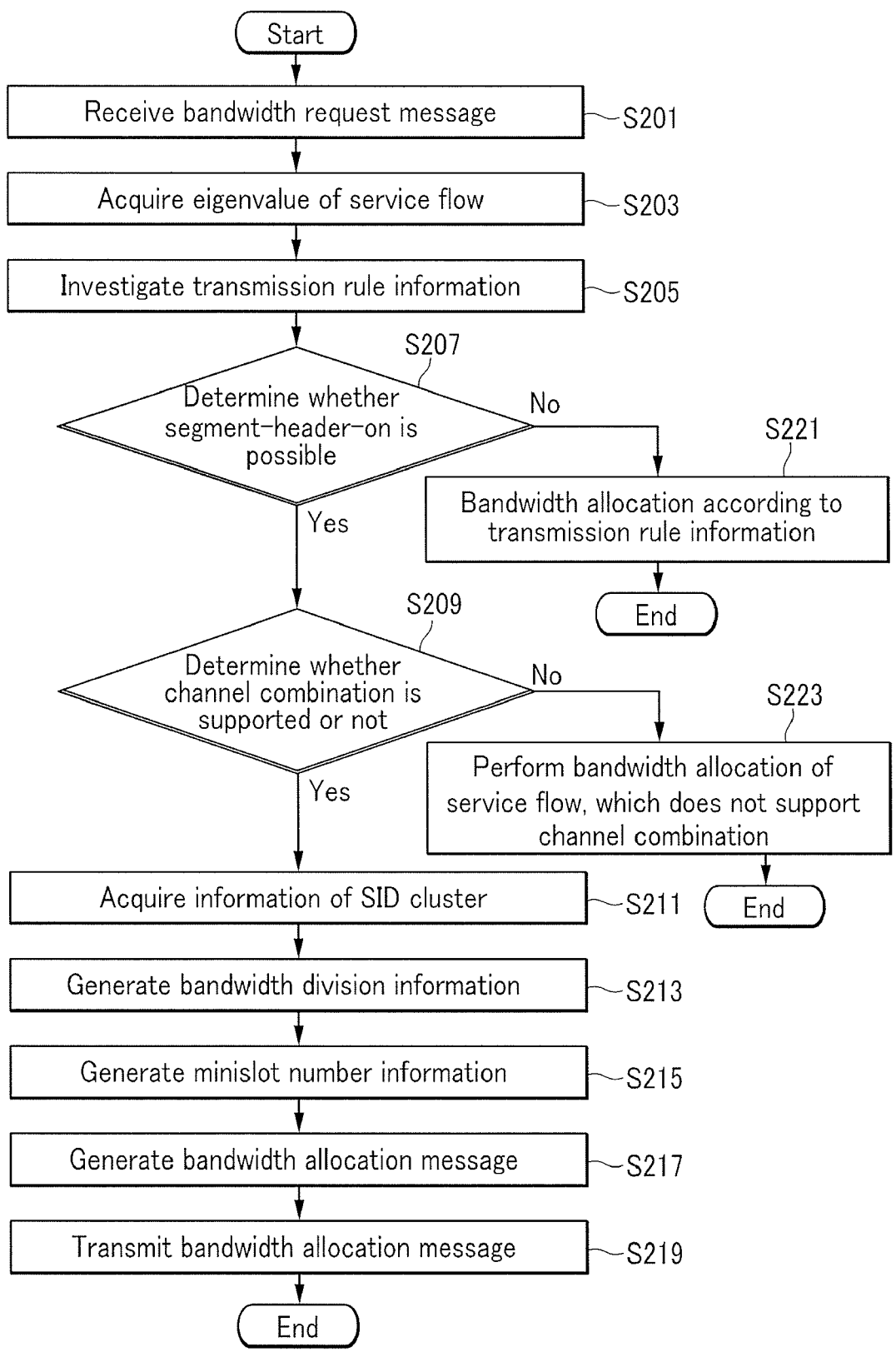
FIG. 6 is a view illustrating a method of allocating an upstream bandwidth according to an exemplary embodiment of the present invention.

FIG. 6 is a view illustrating a method of allocating an upstream bandwidth according to an exemplary embodiment of the present invention.

As shown in FIG. 6, first, the CMTS receives the bandwidth request message from the CM (S201). In this case, the bandwidth request message includes SID information corresponding to the identifier of the CM and bandwidth demand information that is request by the CM.

Subsequently, the CMTS interprets the bandwidth request message to acquire an eigenvalue of a service flow to which SID corresponding to the SID information included in the bandwidth request message belongs (S203).

After that, the CMTS investigates transmission rule information of the service flow in a request/transmission policy on the basis of the eigenvalue of the service flow (S205).

Then, the CMTS determines whether segment-header-on of the corresponding service flow is possible on the basis of the transmission rule information (S207).

If the segment-header-on is possible, the CMTS determines whether SID included in the corresponding service flow supports channel combination on the basis of the transmission rule information (S209).

If the SID supports the channel combination, the CMTS acquires the information of a service identifier cluster (hereinafter referred to as a "SID cluster") corresponding to the service flow by the eigenvalue of the service flow (S211). In this case, the information of the SID cluster includes number information of upstream channels that form the SID cluster, and upstream channel identifier information. Further, a plurality of upstream channels, which form the SID cluster, correspond to a plurality of upstream channels of which bandwidths are to be allocated to the CM.

After that, the CMTS generates bandwidth division information representing the sizes of the bandwidths to be allocated to each of the plurality of upstream channels of which bandwidths are to be allocated (S213). In this case, the bandwidth division information may satisfy Equation 1.

$$(DIV\_BW) = (X/\text{Num\_of\_UCID}) + (\text{Segment\_Header}) \quad \text{(Equation 1)}$$

In Equation 1, (DIV_BW) indicates bandwidth division information, X indicates the entire bandwidth demand, and Num_of_UCID indicates the number of upstream channels of the SID cluster. In this case, (Segment_Header) indicates the size of the segment header.

The entire bandwidth demand corresponds to the bandwidth demand information included in the bandwidth request message, and the number of the upstream channels corresponds to the number information of the upstream channels included in the information of the SID cluster. Further, the size of the segment header may be predetermined.

Next, the CMTS calculates the number of minislots corresponding to the sizes of the bandwidths to be allocated to each of the plurality of upstream channels of which bandwidths are to be allocated on the basis of the bandwidth division information, and generates minislot number information representing the number of the minislots to be allocated to each of the plurality of upstream channels of which bandwidths are to be allocated (S215).

In this case, the time bandwidth of each of the plurality of upstream channels may be composed of minislots that have different time intervals, and the CMTS may allocate the different number of minislots to each of the plurality of upstream channels of which bandwidths are to be allocated.

After that, the CMTS generates a bandwidth allocation message on the basis of the minislot number information (S217).

A method of generating a bandwidth allocation message by the CMTS according to the exemplary embodiment of the present invention will be described below with reference to FIG. 7.

FIG. 7 is a view illustrating a method of generating a bandwidth allocation message according to an exemplary embodiment of the present invention.

As shown in FIG. 7, first, the CMTS generates UCID information, which includes UCIDs of the plurality of upstream channels of which bandwidths are to be allocated, among all of the upstream channels by offset values of all of the upstream channels (S217a). In this case, the CMTS may select a plurality of upstream channels of which bandwidths are to be allocated among all of the upstream channels, and then generates UCID information.

When the CMTS allocates bandwidths to the four upstream channels and the UCIDs of the four upstream channels of which bandwidths are to be allocated are $UCID_1$, $UCID_2$, $UCID_3$, and $UCID_4$, the UCID information includes the $UCID_1$, the $UCID_2$, the $UCID_3$, and the $UCID_4$.

Next, the CMTS investigates a bandwidth allocation time point of each of the plurality of upstream channels of which bandwidths are to be allocated (S217b).

In this case, the bandwidth allocation time point of the $UCID_1$ is represented by $T_1$, the bandwidth allocation time point of the $UCID_2$ is represented by $T_2$, the bandwidth allocation time point of the $UCID_3$ is represented by $T_3$, and the bandwidth allocation time point of the $UCID_4$ is represented by $T_4$.

After that, the CMTS arranges the upstream channels of which bandwidths are to be allocated in an order of the bandwidth allocation time points according to the bandwidth allocation time points of the plurality of upstream channels of which bandwidths are to be allocated (S217c).

In this case, if the bandwidth allocation time points are in an order of $T_1$, $T_2$, $T_3$, and $T_4$, the CMTS arranges the $UCID_1$, the $UCID_2$, the $UCID_3$, and the $UCID_4$ in this order.

Next, the CMTS calculates a time difference between the bandwidth allocation time points of two adjacent upstream channels of the plurality of upstream channels that are arranged according to the bandwidth allocation time points (S217d).

In this case, the time difference between the bandwidth allocation time points may satisfy Equation 2.

$$\text{Diff}_{((i+1)-i)} = T_{i+1} - T_i \quad \text{(Equation 2)}$$

In Equation 2, $\text{Diff}_{((i+1)-i)}$ indicates time difference between the bandwidth allocation time points of two adjacent upstream channels, $T_{i+1}$ indicates a bandwidth allocation time point of an $UCID_{i+1}$, and $T_i$ indicates a bandwidth allocation time point of an $UCID_i$.

Further, $\text{Diff}_{2-1}$ indicates a time difference between the bandwidth allocation time points of the $UCID_1$ and the $UCID_2$, $\text{Diff}_{3-2}$ indicates a time difference between the bandwidth allocation time points of the $UCID_2$ and the $UCID_3$, and $\text{Diff}_{4-3}$ indicates a time difference between the bandwidth allocation time points of the $UCID_3$ and the $UCID_4$.

Next, the CMTS compares the time difference of the bandwidth allocation time points with the size of a time bandwidth allocated to each of the upstream channels, to determine whether the upstream channels of which bandwidths are to be allocated are reformed or not (S217e).

In this case, if $\text{Diff}_{2-1}$ is larger than the size of the bandwidth allocated to the $UCID_2$, the CMTS may allocate the bandwidth allocated to the $UCID_2$ to the $UCID_1$, the $UCID_3$, or the $UCID_4$ in order to reform the upstream channels of which bandwidths are to be allocated.

If the upstream channels of which bandwidths are to be allocated are reformed, the CMTS determines whether minislots of which bandwidths are to be further allocated exist in a plurality of reformed upstream channels (S217f).

In this case, the CMTS determines whether minislots of which bandwidths are to be further allocated exist in the $UCID_1$, the $UCID_3$ or the $UCID_4$ instead of the $UCID_2$.

If the minislots of which bandwidths are to be further allocated exist, the CMTS determines whether bandwidths to be further allocated can be evenly allocated (S217g).

In this case, the CMTS determines whether the bandwidths to be further allocated can be evenly allocated to the $UCID_1$, the $UCID_3$, and the $UCID_4$.

If the bandwidths to be further allocated can be evenly allocated, the CMTS evenly allocates the bandwidths to be further allocated to each of the plurality of reformed upstream channels (S217h).

Then, the CMTS generates a bandwidth allocation message. The bandwidth allocation message includes UCID information including a UCID of each of the plurality of reformed upstream channels, bandwidth allocation time point information including a bandwidth allocation time point of each of the plurality of reformed upstream channels, and minislot number information including the number of minislots allocated to each of the plurality of reformed upstream channels (S217i).

Meanwhile, if the upstream channels of which bandwidths are to be allocated are not reformed, the CMTS generates a bandwidth allocation message. The bandwidth allocation message includes UCID information including a UCID of each of plurality of upstream channels of which bandwidths are to be allocated, bandwidth allocation time point information including a bandwidth allocation time point of each of the plurality of upstream channels of which bandwidths are to be allocated, and minislot number information including the number of minislots allocated to each of the plurality of upstream channels of which bandwidths are to be allocated.

Meanwhile, if minislots to be further allocated exist in only a part of upstream channels, the CMTS further allocates bandwidths to the upstream channels in which minislots to be further allocated exist.

In addition, if the bandwidths to be further allocated cannot be evenly allocated, the CMTS again selects a plurality of upstream channels of which bandwidths are to be allocated.

The method of allocating an upstream bandwidth to the CM by the CMTS according to the exemplary embodiment of the present invention will be described below with reference to FIG. 6 again.

Then, the CMTS transmits a bandwidth allocation message to the CM (S219).

Meanwhile, if the segment-header-on is not possible, the CMTS performs bandwidth allocation according to the transmission rule information (S221).

Meanwhile if the channel combination is not supported, the CMTS performs the bandwidth allocation of a service flow, which does not support the channel combination, according to the transmission rule information (S223).

According to the present invention, a cable modem termination system can receive segment data transmitted from a cable modem, minimize time required for processing the received segment data, and minimize the size of a buffer that is used to process the segment data by the cable modem termination system.

The above-mentioned exemplary embodiments of the present invention are not embodied only by a method and apparatus. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A computerized method of allocating an upstream bandwidth to a modem of which channel combination is supported by a system, the method comprising:

receiving a bandwidth request message that comprises bandwidth demand information and service identifier information corresponding to the modem;

collecting channel identifier information and channel number information of a plurality of channels for the modem on the basis of the service identifier information;

generating time bandwidth size information that represents the size of the time bandwidth to be allocated to each of the plurality of channels on the basis of the bandwidth demand information and the channel number information; and generating with a processor a bandwidth allocation message that allocates a part of the plurality of channels to the modem on the basis of the channel identifier information and the time bandwidth size information, wherein the bandwidth allocation message comprises:

channel identifier information that comprises identifiers of the plurality of channels to be allocated to the modem;

bandwidth allocation time point information that comprises bandwidth allocation time points of the plurality of channels to be allocated to the modem; and bandwidth size information that comprises sizes of time bandwidths to be allocated to the plurality of channels to be allocated to the modem, and wherein the generating of the bandwidth allocation message comprises:

arranging the plurality of channels in an order of bandwidth allocation time points of the plurality of channels;

calculating a time difference between the bandwidth allocation time points of at least one pair of the plurality of channels arranged according to the bandwidth allocation time points;

allocating a part of at least one of the plurality of channels to the modem according to the time difference between the bandwidth allocation time points and bandwidth division information; and further allocating time bandwidths, which are allocated to other channels not allocated to the modem among the plurality of channels, to the modem.

2. The method of claim 1, wherein the calculating of the time difference calculates a time difference between the bandwidth allocation time points of two adjacent channels of the plurality of arranged channels.

3. The method of claim 2, wherein if the time difference between the bandwidth allocation time points of the two adjacent channels is larger than the size of the time bandwidth allocated to a channel that has a later bandwidth allocation time point of the two adjacent channels, the allocating of a part of the plurality of channels to the modem allocates a part of the channels except for the channel that has the later bandwidth allocation time point of the plurality of channels to the modem.

4. The method of claim 1, wherein the further allocating of the time bandwidths evenly allocates time bandwidths, which are allocated to a part of channels not allocated to the modem, to the modem.

5. The method of claim 1, wherein the generating of the time bandwidth size information comprises:

generating bandwidth division information that comprises the size of a bandwidth to be allocated to each of the plurality of channels according to the bandwidth demand information and the channel number information; and calculating a number of minislots that corresponds to the size of a bandwidth to be allocated to each of the plurality of channels on the basis of the bandwidth division information in order to generate minislot number information that comprises the number of minislots to be allocated to each of the plurality of channels.

6. The method of claim 5, wherein the size of the bandwidth to be allocated to each of the plurality of channels is proportional to the bandwidth demand information, and inversely proportional to the channel number information.

7. The method of claim 5, wherein the time bandwidth of each of the plurality of channels is composed of minislots that have different time intervals, and the numbers of minislots to be allocated to the plurality of channels are different from each other.

8. The method of claim 1, further comprising transmitting the bandwidth allocation message to the modem.

\* \* \* \* \*